(12) United States Patent
Hamasaki et al.

(10) Patent No.: US 6,833,085 B2
(45) Date of Patent: Dec. 21, 2004

(54) AGENT FOR RESTRICTING ELUTION OF PHOSPHORUS, METHOD FOR PRODUCING THE SAME, AND METHOD OF RESTRICTING ELUTION OF PHOSPHORUS IN SLUDGE

(76) Inventors: Kiyoharu Hamasaki, 2-6-12, Hattori, Ikaruga-cho, Ikoma-gun, Nara (JP); Hironobu Hirasawa, 1-113, Matsuno-cho, Kusakabe, Inazawa-shi, Aichi (JP); Noboru Yamada, 64-8, Kurigadani, Hashimoto, Yawata-shi, Kyoto (JP)

( * ) Notice: Subject to any disclaimer, the term of this patent is extended or adjusted under 35 U.S.C. 154(b) by 40 days.

(21) Appl. No.: 10/360,918

(22) Filed: Feb. 10, 2003

(65) Prior Publication Data

US 2004/0154989 A1 Aug. 12, 2004

(51) Int. Cl.$^7$ .................... C01B 21/20; C01B 15/055; C02F 1/72
(52) U.S. Cl. .................. 252/186.44; 252/186.21; 252/186.25; 210/747; 210/758; 510/302; 510/367; 510/481; 510/508
(58) Field of Search .............. 252/186.21, 186.25, 252/186.44; 210/747, 758; 149/19.1, 20, 46, 60, 61, 73; 510/302, 367, 481, 508

(56) References Cited

U.S. PATENT DOCUMENTS

| | | | | |
|---|---|---|---|---|
| 1,893,946 A | * | 1/1933 | Oscar | 423/395 |
| 2,041,088 A | * | 5/1936 | Wilhelm | 427/184 |
| 2,199,217 A | * | 4/1940 | Cook et al. | 149/8 |
| 3,034,911 A | * | 5/1962 | McKee | 106/206.1 |
| 3,149,956 A | * | 9/1964 | Seymour et al. | 71/29 |
| 3,276,949 A | * | 10/1966 | Robson et al. | 423/474 |
| 4,013,581 A | * | 3/1977 | Huber | 252/186.26 |
| 4,120,378 A | * | 10/1978 | Mills et al. | 182/14 |
| 4,369,308 A | * | 1/1983 | Trubiano | 536/106 |
| 4,460,490 A | * | 7/1984 | Barford et al. | 510/192 |
| 5,407,598 A | * | 4/1995 | Olson et al. | 252/186.35 |
| 5,753,602 A | * | 5/1998 | Hung et al. | 510/192 |
| 5,900,399 A | * | 5/1999 | Seiter et al. | 510/446 |
| 6,271,190 B1 | * | 8/2001 | Boskamp et al. | 510/446 |
| 6,306,814 B1 | * | 10/2001 | Appel et al. | 510/446 |
| 2002/0004472 A1 | * | 1/2002 | Holderbaum et al. | 510/290 |
| 2002/0148036 A1 | * | 10/2002 | Wilson et al. | 4/231 |
| 2002/0160930 A1 | * | 10/2002 | Emmerson et al. | 510/445 |

\* cited by examiner

*Primary Examiner*—Joseph D. Anthony
(74) *Attorney, Agent, or Firm*—Wenderoth, Lind & Ponack, L.L.P.

(57) ABSTRACT

Calcium nitrate, which is known to have the effect of inhibiting elution of phosphorus contained as insoluble substance in sludge in rivers, lakes and coasts in a reducing environment, can be applied not by injection of an aqueous solution of calcium nitrate, but by putting it in a solid form. An agent for inhibiting elution of phosphorus is proposed which comprises calcium nitrate as the major component (10–30%), calcium carbonate or calcium sulfate (a total of 50–90%), and stearic acid or its salt (1–20%) as a hydrophobic substance for delaying elution of the calcium salt, and sucrose fatty acid isobutyl or paraoxy isobutyl benzoate (1–20%) as a binder, and the composition is pressed in a mold into tablets or briquette. The application into sludge by use of an air gun is preferable.

7 Claims, 1 Drawing Sheet

Figure 1:
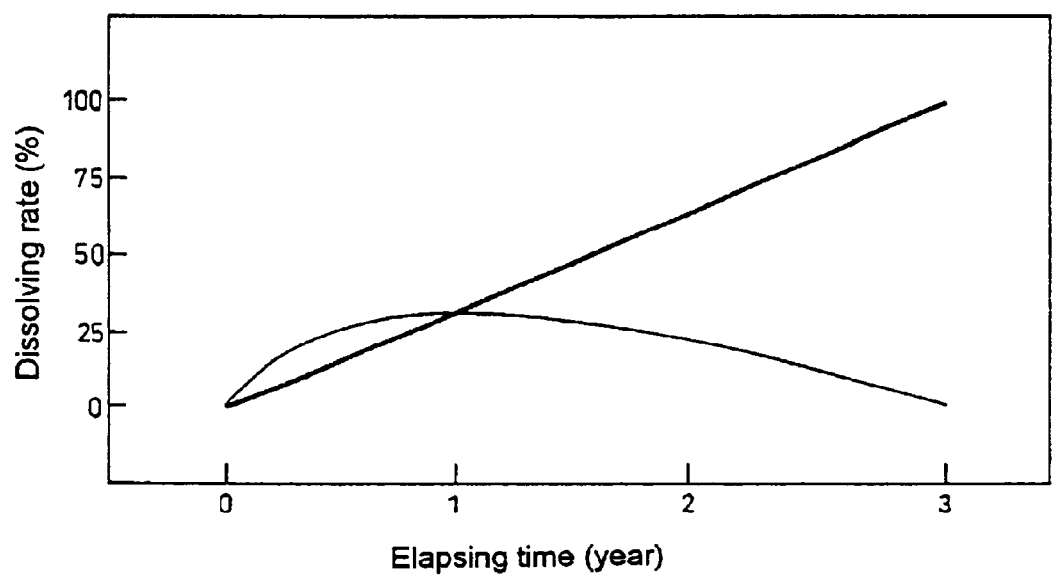

AGENT FOR RESTRICTING ELUTION OF PHOSPHORUS, METHOD FOR PRODUCING THE SAME, AND METHOD OF RESTRICTING ELUTION OF PHOSPHORUS IN SLUDGE

BACKGROUND OF THE INVENTION

The present invention relates to an agent for inhibiting elution of phosphorus, which is dumped into sludge in lakes, rivers, canals or sea to insolubilize and fix phosphorus that exist in sludge and elutes under reducing conditions, a method of manufacturing the same, and a method of inhibiting elution of phosphorus in sludge by use of the same.

In sludge in lakes, rivers, canals and sea, there exist phosphorus compounds originating mainly from household sewage. Though depending on places, their amounts are relatively large. This type of phosphorus compounds normally exist as a solid. But if the environment of the sludge turns to reducing conditions, they elute into water. When organic matters in sludge decompose, oxygen is consumed, so that reducing conditions often reveal. Phosphorus that has eluted into water causes water blooms or red tides. Thus it has to be removed.

Heretofore, in order to eliminate influence of phosphorus compounds in water, removing sludge has been considered to be the only way and dredging has been carried out. But dredging not only gives damage to benthos and waterweeds, thus damaging the biosphere. No expected results can be achieved by dredging because sludge tends to scatter into water. Further, there is a problem of how the sludge taken out by dredging should be disposed of.

Therefore, efforts are being done to fix phosphorus compounds in sludge so that they will not elute even under reducing conditions and thus will not cause eutrophication. For example, in Shiga prefecture, in order to improve the water quality of Lake Biwa and to prevent generation of water blooms and freshwater red tides, trials are being made to inject an aqueous solution of calcium nitrate into sludge. According to an article on the front page of the Mainichi Shimbun newspaper, Oct. 5, 1997 edition, as substances for which one can expect functions as oxidants, ferric chloride, alum and calcium nitrate were selected, their aqueous solutions were added into sludge, and it was examined to what extent phosphorus in sludge eluted. The following results were obtained.

| Oxidant | Concentration (%) | Amount of diluted phosphorus ($\mu$g/L) |
|---|---|---|
| Ferric chloride | 0.32 | 402 |
|  | 0.16 | 234 |
| Alum | 0.42 | 490 |
|  | 0.21 | 407 |
| Calcium nitrate | 0.70 | 13 |
|  | 0.35 | 67 |

These data show that by injecting a 0.7% aqueous solution of calcium nitrate, elution of phosphorus can be inhibited by as much as 98%.

But injection of such an aqueous solution into sludge is low in effect unless it is suitably carried out, so that it is necessary to manufacture a special device suitable for such work. The abovesaid newspaper article carries photos of a device having numerous nozzles planted in a steel plate. If they are used in the form of a liquid, due to dispersion into water during injection, calcium nitrate will not necessarily function with high efficiency. Further, while the effect of calcium nitrate can be expected after injection, it is poor in sustainability, so that injection has to be frequently carried out.

An object of the present invention is to provide an agent for inhibiting elution of phosphorus which can be used not by injection of an aqueous solution but in an easier way, is low-cost and high in the effect and sustains its effect for a longer period of time. Another object of the present invention is to provide a method of manufacturing such an agent for inhibiting elution of phosphorus, and a method of inhibiting elution of phosphorus present in sludge.

ABSTRACT OF THE INVENTION

The agent for inhibiting elution of phosphorus of the present invention comprises as its major component an oxidant and a soluble calcium salt, and a hydrophobic substance that delays elution of the soluble calcium salt, and a binder, the composition being formed into tablets or briquette. It inhibits elution of phosphorus in sludge in rivers, lakes and sea by fixing it.

The method of manufacturing the agent for inhibiting elution of phosphorus according to the present invention comprises the steps of mixing a composition which comprises an oxidant and a soluble calcium salt as major components, a hydrophobic substance for delaying elution of the soluble calcium salt and a binder, and if necessary, contains ferric chloride, putting the mixture in a mold, and pressing it into tablets or briquette.

The method of the present invention for inhibiting elution of phosphorus present in sludge using the agent for inhibiting elution of phosphorus comprises putting the tablets or briquette of the agent for inhibiting elution of phosphorus into sludge in lakes, rivers, canals or sea to fix the phosphorus.

SIMPLIFIED DESCRIPTION OF THE DRAWING

FIG. 1 is a graph showing how the agent prepared in the Embodiment gradually dissolved in water.

DETAILED DESCRIPTION OF THE PREFERRED EMBODIMENT

As the oxidant forming the agent for inhibiting elution of phosphorus of the present invention, a sodium, potassium, ammonium, calcium, magnesium or manganese salt of nitrate, or alum may be used.

As the soluble calcium salt, nitrate, sulfate, carbonate or hydrogencarbonate salt of calcium can be used. Calcium nitrate, which has the function as an oxidant and is also a soluble calcium salt, is the most preferable as a material for the agent for inhibiting elution of phosphorus.

The hydrophobic substance is a component for delaying elution of the soluble calcium salt, thereby making the function of inhibiting elution of phosphorus long-lasting. Preferable hydrophobic substances are aliphatic carboxylic acids that are solid at normal temperature and have a carbon number of about 11–31, and specifically stearic acid, myristic acid, and behenic acid. Also, these fatty acids may be salts such as calcium or magnesium salts. Esters such as sucrose fatty acid isobutyl and paraoxy isobutyl benzoate are also useful.

The binder serves to bind the abovesaid components. The abovesaid aliphatic carboxylic acids or their esters, and aromatic carboxylic acids or their esters are preferable as the binder. According to the selection of materials, ones having both the properties as a hydrophobic substance and a binder may be used.

In inhibiting elution of phosphorus in sludge, it is known that the presense of iron is preferable because iron ions form ferric chloride and become insoluble. In an environment where phosphorus flows into lake water, iron, too, often flows thereinto. But in some cases, it is preferable to supplement iron. In such a case, it is preferable that the composition of the present invention further contains a ferric salt such as ferric chloride as a constituent component.

The contents of the respective components forming the composition for the agent for inhibiting elution of phosphorus of the present invention are preferably 10–30% of the oxidant, 50–90% of the soluble calcium salt, 1–20% of the hydrophobic substance, and 1–20% of the binder, all in weight %. If a ferric salt is added, its content is preferably up to 10% of the composition. If calcium nitrate, which is an oxidant and a source of soluble calcium, is used, its content is preferably 10–30%.

Besides, provided its object is achievable, the agent for inhibiting elution of phosphorus according to the present invention may contain any other additives.

In order to form the composition of the agent for inhibiting elution of phosphorus into tablets or briquette, ordinary tableters or briquetting machine may be used. As in the below-described Examples, in order to achieve the slow releasability (slow effect) intended in the present invention, it is necessary to compact it sufficiently by applying a considerable pressure (e.g. 20–100 kg/cm$^2$). While their size is not limited, they are preferably flat columnar with a diameter of 30–45 mm and a height of 15–30 mm.

But if an immediate effect is required, the composition is preferably formed into products at a relatively low pressure. The degree of immediate effects and delayed effects can be adjusted by the pressure during forming, and also by the amount of the hydrophobic substance and that of the binder. Thus, depending on the circumstance in which the agent for inhibiting elution of phosphorus is used, it is preferable to use one having an immediate effect or delayed effect or both are used in combination.

An agent for inhibiting elution of phosphorus that has been formed into tablets or briquette is used by feeding them to a suitable position in sludge. Normally, simply putting the agent into sludge is sufficient. But according to the state of the sludge, it may be effective to use an air gun to drive them deep.

EXAMPLE 1

The components were blended by the following contents, put in a tableter, and pressurized at the pressure of 40 kg/cm$^2$ to form columnar tablets having a diameter of 37 mm and a height of 20 mm and weighing about 40 g.
  Calcium nitrate: 20 parts (in weight)
  Calcium carbonate: 60 parts
  Silicic acid (white carbon): 3 parts
  Stearic acid: 15 parts
  Sucrose fatty acid ester: 2 parts

EXAMPLE 2

The components were blended by the following contents, put in a tableter, and pressurized at the pressure of 100 kg/cm$^2$ to form columnar tablets having a diameter of 37 mm and a height of 18 mm and weighing about 40 g.
  Calcium nitrate: 20 parts
  Calcium carbonate: 65 parts
  Silicic acid (white carbon): 4 parts
  Magnesium stearate: 10 parts
  paraoxy isobutyl benzoate: 1 part

EXAMPLE 3

The components were blended by the following contents, put in a tableter, and pressurized at the pressure of 80 kg/cm$^2$ to form columnar tablets having a diameter of 45 mm and a height of 25 mm and weighing about 55 g.
  Calcium nitrate: 30 parts
  Calcium carbonate: 55 parts
  Stearic acid: 10 parts
  Magnesium stearate: 3 parts
  Sucrose fatty acid ester: 1 part

EXAMPLE 4

The components were blended by the following contents, put in a tableter, and pressurized at the pressure of 100 kg/cm$^2$ to form columnar tablets having a diameter of 37 mm and a height of 18 mm and weighing about 40 g.
  Calcium nitrate: 10 parts
  Magnesium nitrate: 10 parts
  Calcium sulfate: 20 parts
  Calcium carbonate: 50 parts
  Silicic acid (white carbon): 3 parts
  paraoxy benzoic isobutyl: 2 parts

[Solubility Test]

The tablets prepared in Example 3 were put in a water tank kept at normal temperature. While displacing water at a rate of 1 liter per hour, how the tablets dissolved was traced by measuring the remaining amounts of the tablets once every week. They completely dissolved and disappeared in three years and several days. This means that they eluted by 5–6 mg per day on average. Change of the dissolving rate during this period is shown in the graph of FIG. 1 in which the "dissolving rate" is calculated based on the calcium concentration in the liquid. The curve in the graph represents change in the dissolving rate of calcium nitrate. The straight line shows a change in the accumulated dissolved amount.

By using the tablets of Example 3, which shows gradually dissolving property, it is possible to inhibit elution of phosphorus in sludge for a long time. Besides, sulfides in the sludge also decrease, so that the quality of water improves and hydrogen sulfide turns into calcium sulfide and becomes odorless.

This was also apparent from the fact that in a separately conducted experiments in which in sludge at depth of 2–3 meters under the sea surface, the tablets of Example 3 were put in by 100–150 g/m$^2$ and the amount of sulfide in the sludge one month later was measured, sulfide ions, which were originally 1.10 mg/l, decreased to less than 0.01 mg/l.

With the agent for inhibiting elution of phosphorus of the present invention, in inhibiting elution of phosphorus contained in sludge in rivers, lakes, coasts under reducing conditions, it is possible to give the agent at suitable positions in the sludge not by injecting an aqueous solution into sludge using a special device, but by putting or throwing tablets or briquette with an air gun. Further, it is possible to reduce the concentration of sulfide ions.

Since the tablets or briquette act while gradually dissolving in sludge, the effects of inhibiting elution of phosphorus lasts for a long time. Since the releasing rate can be adjusted in a certain range by selecting the forming conditions. If the effect of inhibiting elution of phosphorus must reveal relatively quickly, ones having corresponding dissolving properties should be manufactured and used. Also, using two or three or more kinds having different dissolving properties is meaningful. Since solid substances will not disperse in water before they serve the purpose of restriction as with aqueous solution, they are high in use efficiency.

Generally, a nitrate is high in water solubility and has deliquescent property more or less. But by using a hydrophobic substance in accordance with the present invention, the agent for inhibiting elution of phosphorus shows no deliquescent properties. Thus it is possible to preserve them for a long time without taking any special measures. The agent for inhibiting elution of phosphorus of the present invention can be manufactured at a low cost from the viewpoint of both its material and manufacturing method.

Thus, by inhibiting elution of phosphorus in sludge in accordance with the present invention, it is possible to prevent production of water blooms and red tides. This helps preservation of water quality and prevents impact on fishery.

What is claimed is:

1. An agent for inhibiting elution of phosphorus in sludge by fixing the phosphorus, said agent being formed by press molding a composition into tablet(s) and/or briquette(s) which comprises 10–30 weight % of an oxidant selected from the group consisting of the sodium, potassium, ammonium, calcium, magnesium or manganese salt of nitrate or alum, 50–90 weight % of a soluble calcium salt selected from the group consisting of calcium nitrate, calcium sulfate, calcium carbonate, calcium hydrogencarbonate, and mixtures thereof 1–20 weight % of a hydrophobic substance for delaying elution of said soluble calcium salt selected from the group consisting of a fatty acid or its salt, and 1–20 weight % of a binder different from said hydrophobic substance and which is selected from the group consisting of an aliphatic carboxylic acid or its ester and an aromatic carboxylic acid or its ester; with the proviso that when calcium nitrate is selected as the oxidant and as a source of soluble calcium, it is used at a concentration of 10–30 weight % and another of said soluble calcium salts is/are present to bring up the soluble calcium salt concentration to within the claimed 50–90 weight % range.

2. An agent for inhibiting elution of phosphorus as claimed in claim 1 wherein as a component that is both an oxidant and a soluble calcium salt, calcium nitrate is selected, and as the hydrophobic substance, a stearic acid or its salt is selected, and as said binder, sucrose fatty acid isobutyl or paraoxy-isobutyl benzoate is selected.

3. An agent for inhibiting elution of phosphorus as claimed in any of claim 1 or 2 wherein said composition further contains 0–10 weight % of ferric chloride.

4. A method of manufacturing an agent according to claim 1 or 3 for inhibiting elution of phosphorus in sludge by fixing the phosphorus, comprising the steps of mixing a composition which comprises an oxidant and a soluble calcium salt as the major components, a hydrophobic substance for delaying elution of the soluble calcium salt, and a binder, and if necessary, ferric chloride, putting said composition in a mold and pressing it into tablets or briquette.

5. A method of manufacturing an agent according to claim 4 wherein the ferric chloride is contained at a concentration of 0–10 weight percent.

6. A method of inhibiting elution of phosphorus present in sludge, comprising the steps of putting the tablets or briquette formed of the agent for inhibiting elution of phosphorus claimed in any of claim 1 or 3 into sludge in a lake, river, canal or sea to fix phosphorus.

7. A method of inhibiting elution of phosphorus present in sludge according to claim 6 wherein said agent further comprises 0–10 weight % of ferric chloride.

* * * * *